(12) United States Patent
Van Haaren

(10) Patent No.: US 9,146,137 B2
(45) Date of Patent: Sep. 29, 2015

(54) AIR CELL INDICATOR

(71) Applicant: Amtrol Licensing Inc., West Warwick, RI (US)

(72) Inventor: Christopher A. Van Haaren, Warwick, RI (US)

(73) Assignee: AMTROL Licensing Inc., West Warwick, RI (US)

( * ) Notice: Subject to any disclaimer, the term of this patent is extended or adjusted under 35 U.S.C. 154(b) by 380 days.

(21) Appl. No.: 13/712,437

(22) Filed: Dec. 12, 2012

(65) Prior Publication Data

US 2014/0158573 A1 Jun. 12, 2014

(51) Int. Cl.

| G01L 7/16 | (2006.01) |
|---|---|
| F16L 55/053 | (2006.01) |
| G01D 7/00 | (2006.01) |
| G01D 13/00 | (2006.01) |

(52) U.S. Cl.
CPC ............... *G01D 7/00* (2013.01); *F16L 55/053* (2013.01); *G01D 13/00* (2013.01)

(58) Field of Classification Search
CPC ........... F15B 2201/50; F15B 2201/505; F15B 2201/51; F15B 2201/515; F16L 55/05; G01L 7/16; G01L 7/163; G01L 7/166
USPC ............ 116/266, 268, 272; 138/30; 220/4.12, 220/560, 721, 530
See application file for complete search history.

(56) References Cited

U.S. PATENT DOCUMENTS

| 5,386,925 A * | 2/1995 | Lane ............................ 220/530 |
| 6,915,922 B2 * | 7/2005 | Wang ............................ 220/720 |
| 8,633,825 B2 * | 1/2014 | Fuller et al. .................... 340/654 |
| 2003/0056711 A1 * | 3/2003 | Tranter ......................... 116/272 |

FOREIGN PATENT DOCUMENTS

| EP | 2722575 A1 * | 4/2014 | ............ F16L 55/053 |
| JP | 10072093 A * | 3/1998 | ............ B65D 90/48 |
| WO | WO 2007069887 A1 * | 6/2007 | ................ F15B 1/02 |
| WO | WO 2014093634 A3 * | 11/2014 | ............... B65D 1/00 |

* cited by examiner

*Primary Examiner* — Richard A Smith
(74) *Attorney, Agent, or Firm* — Locke Lord LLP; Scott D. Wofsy

(57) ABSTRACT

A fluid tank has a housing that has an upper end wall, a side wall, and a lower end wall that together define a cavity. A flexible diaphragm is connected to the side wall within the cavity and separates the cavity into an upper portion, which is sealed to contain a pressurized gas, and a lower portion, which is sealed to contain a pressurized fluid. An indicator is positioned in the upper wall of the housing and has an indicator arm and a visual indicator. The indicator arm is not visible and the visual indicator is visible with the indicator in a first position and the indicator arm is visible and the visual indicator is not visible with the indicator in a second position.

20 Claims, 7 Drawing Sheets

AIR CELL INDICATOR

FIELD OF THE INVENTION

The present invention generally relates to well and expansion tanks and, more particularly, to well and expansion tanks having an indicator to alert a user when there is a failure in a portion of the well or expansion tank.

BACKGROUND

Many well and expansion tanks use a diaphragm or bladder to separate air from water. An air charge pressure on one side keeps the diaphragm/bladder at a distance away from the inside wall of the tank in the air dome. When the tank is installed onto a water system, the water system pressure pushes back against the diaphragm/bladder, compressing the air. The proper pre-charge will continue to keep the diaphragm/bladder away from the tank wall. If the pre-charge pressure is not enough to provide an air volume appropriate for the water supply pressure, the diaphragm/bladder will fill the air cell. If eventually the diaphragm/bladder "bottoms out" on the tank wall, the tank becomes ineffective in the function it has been design to provide. Various failure modes for well/expansion tanks include a low air pre-charge, bladder failure resulting in leak of air charge, and installation of an undersized tank causing the diaphragm/bladder to overwork, all of which can lead to quick cycling and ultimately failure.

SUMMARY

In one embodiment, a fluid tank is provided that has a housing that has an upper end wall, a side wall, and a lower end wall that together define a cavity. A flexible diaphragm is connected to the side wall within the cavity and separates the cavity into an upper portion, which is sealed to contain a pressurized gas, and a lower portion, which is sealed to contain a pressurized fluid. An indicator is positioned in the upper wall of the housing and has an indicator arm and a visual indicator. The indicator arm is not visible and the visual indicator is visible with the indicator in a first position and the indicator arm is visible and the visual indicator is not visible with the indicator in a second position.

In another embodiment, a method is provided for indicating a failure in a fluid tank comprising a flexible diaphragm, where the flexible diaphragm divides the tank into a pressurized air portion and a pressurized fluid portion. An indicator is positioned in an upper end wall of the fluid tank and in fluid communication with the pressurized air portion. The indicator has an indicator arm that is not visible with the indicator in a first position and is visible with indicator in a second position and a visual indicator that is visible with the indicator in the first position and not visible with the indicator in the second position. Proximity of the diaphragm to the upper end wall of the fluid tank is detected with the indicator and the indicator is moved from the first position to the second position, such that the indicator arm is visible in response to the detection of the proximity of the diaphragm to the upper end wall.

DETAILED DESCRIPTION

Figure 1:
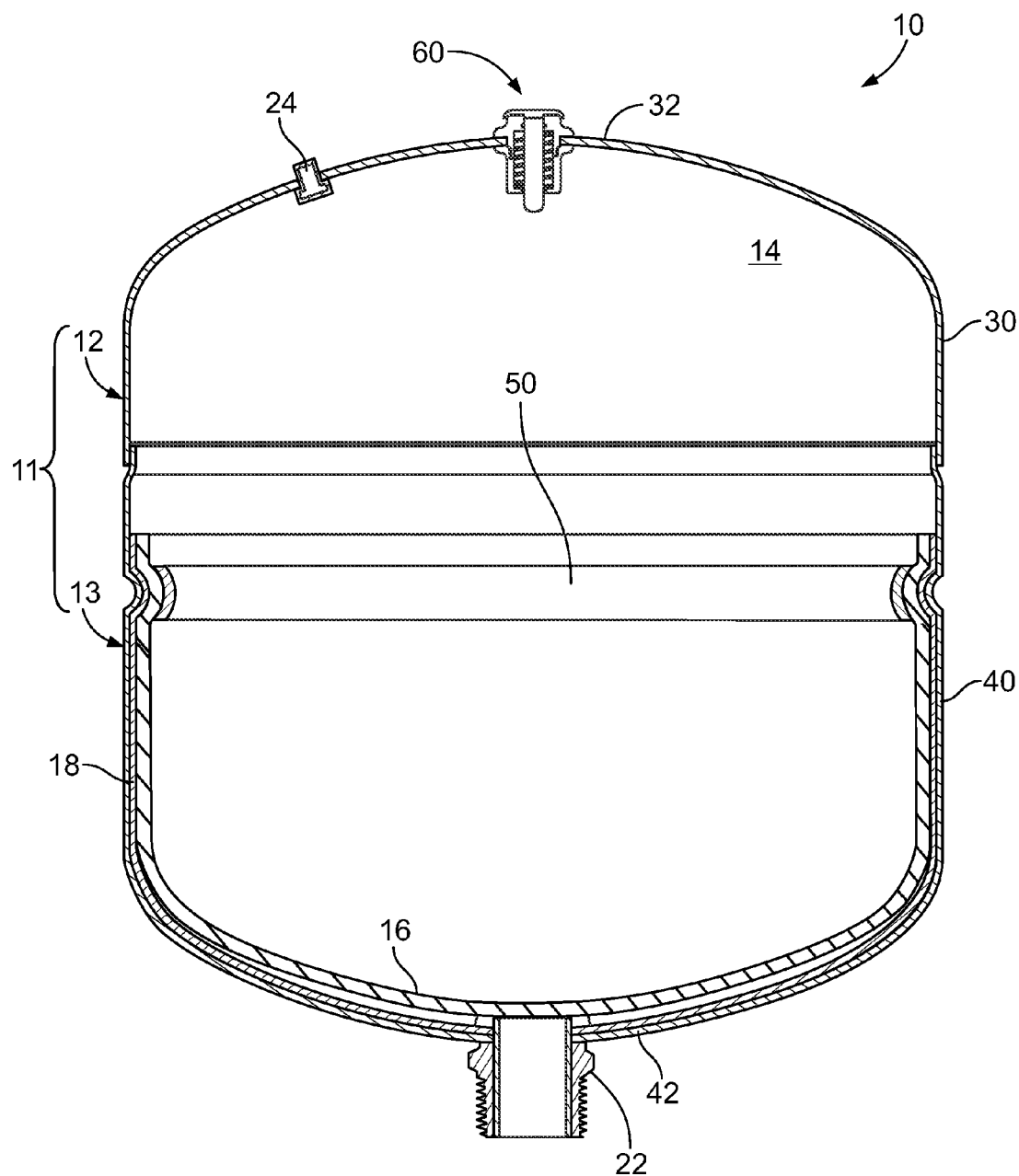
FIG. 1. is a cross-sectional view of an example pre-pressurized well/expansion tank with an indicator.

Incorrect installations of well/expansion tanks, as well as incorrect air pre-charging and air loss failures, may lead to eventual tank failures that may cause water to leak from the tank. Tank undersizing also results in more stress on the tank and can result in premature failure of the tank. The example tank described herein has in indicator that can alert a user to a problem with the system, before a tank failure or leak occurs, by showing a "bad" condition by raising a first part (e.g. red colored) on the outside of the tank. A separate second part (e.g. green colored) may also rest in place in the "good" condition. Therefore, when a "bad" condition extends the first (red) part, the second (green) part will fall off, providing more evidence of a problem. This provides a visual aid indicating the location of the diaphragm within the tank and can be used to indicate maintenance is required by signaling that the diaphragm is out of normal operating position.

Referring now to FIGS. 1-4, an exemplary pre-pressurized well/expansion tank 10 is shown, similar to those shown in U.S. Pat. No. 5,386,925, issued Feb. 7, 1995, and entitled Expansion Tank and U.S. Pat. No. 7,032,628, issued Apr. 25, 2006, and entitled Mobile Prepressurized Diaphragm Type Fluid Storage Tank, both of which are incorporated herein by reference. In the example shown herein, tank 10 has a housing 11, formed by an upper housing 12 and a lower housing 13, that defines an internal cavity 14. A deformable diaphragm 16 and a liner 18 are positioned within the cavity 14 and are removeably attached to lower housing 13 by retaining ring 50. An indicator 60 and a valve 24 are positioned at a top portion of upper housing 12 as is described in more detail below.

Upper housing 12 has a generally cylindrical side wall 30 and an end wall 32. Upper housing 12 can be of any size depending on the desired total volume of tank 10 and can be of the same general design as the lower housing 13. A conventional air stem valve 24, commonly referred to as a "Schrader" valve stem, or the like, is provided in end wall 32 of upper housing 12 to allow the addition or removal of air (gas) to/from cavity 14 for pressurizing tank 10.

Lower housing 13 also has a generally cylindrical side wall 40 and an end wall 42. Lower housing 13 can also be of any size depending on the desired total volume of tank 10. A fitting 22 is provided in end wall 42 of lower housing 13 to allow water to flow into and out of tank 10. Sidewall 40 has a concave groove 44 formed around the circumference of sidewall 40, which mates with grooves formed in diaphragm 16, liner 18, and retaining ring 50, as described below. Sidewall 40 also has an inset portion 46 formed at the end of sidewall 40, which creates an overlap joint with sidewall 30 of upper housing 12 when tank 10 is assembled. Once assembled, upper housing 12 can be welded to lower housing 13.

Upper and lower housings 12, 13 and retaining ring 50 can be made of any suitable material capable of withstanding the pressure desired and compatible with the fluids to be stored and dispensed. High strength structural steel is a convenient material for making upper and lower housings 12, 13 and retaining ring 50 and allows upper and lower housings 12, 13 to be joined together by a welding process. However, a mechanical joint also can be used to join upper and lower housings 12, 13, as long as it provides a structural hermetic seal.

Retaining ring 50 is arcuate with a concave outer portion and a convex inner portion, which corresponds to and mates with groove 44 in sidewall 40, groove 17 in diaphragm 16, and groove 19 in liner 18, as described in more detail below, to anchor diaphragm 16 and liner 18 in place and provide a water and gas tight seal.

Flexible diaphragm 16 is preferably made of an elastomer, such as butyl rubber, and is disposed inside of lower housing 13. Diaphragm 16 has an inwardly protruding groove 17 adjacent its end and is situated so that its end is adjacent the end of liner 18. Groove 17 corresponds to and mates with groove 44 of lower housing 13 and retaining ring 50 to mechanically lock diaphragm 16 to lower housing 13. Diaphragm 16 preferably is molded to conform to the inner shape of lower housing 13. Thus, diaphragm 16 is compressed between retaining ring 50 and sidewall 40 of lower housing 13, forming a hermetic seal against air and the fluid.

Liner 18 is preferably made of a liquid-impervious material, such as polypropylene, covers the inner surface of lower housing 13, and is positioned between lower housing 13 and diaphragm 16. Liner 18 also has an inwardly protruding groove 19 adjacent its end and is situated so that its end is adjacent the end of diaphragm 16. Groove 19 corresponds to and mates with groove 44 of lower housing 13 and retaining ring 50 to mechanically lock liner 18 to lower housing 13. Thus, liner 18 is compressed between retaining ring 50 and sidewall 40 of lower housing 13, forming a hermetic seal against air and the fluid.

The portion of cavity 14 formed between liner 18 and diaphragm 16 forms a water receiving portion of cavity 14. The water is contained between liner 18 and diaphragm 16 so that the entire inner surface of upper and lower housings 12, 13 is shielded from the water. As a result, corrosion of tank 10 is prevented, which allows tank 10 to be constructed of any desired material, without regard to the effect of water on that material. Liner 18 also has an aperture that aligns with fitting 22 and provides a liquid tight seal with fitting 22 to prevent water in tank 10 from flowing between liner 18 and fitting 22.

Figure 6A:
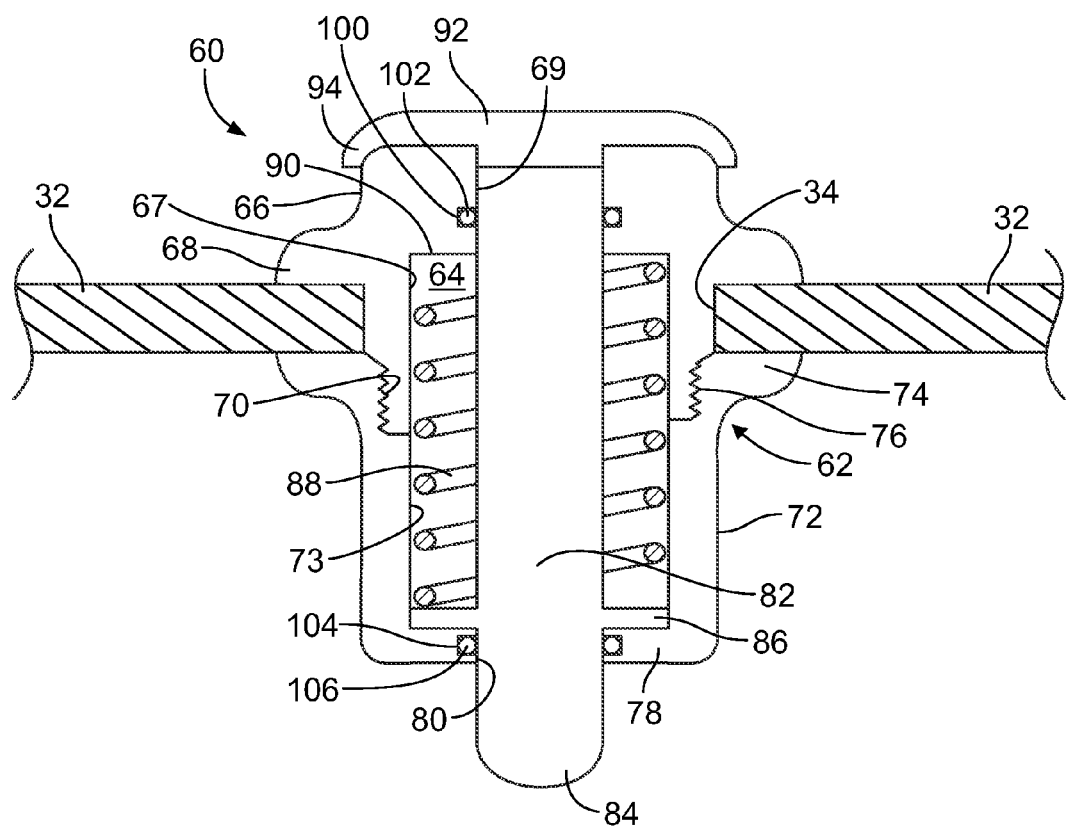
FIG. 6A is an enlarged cross-sectional view of the example indicator shown in FIG. 1 in the normal operating position.
Figure 6B:
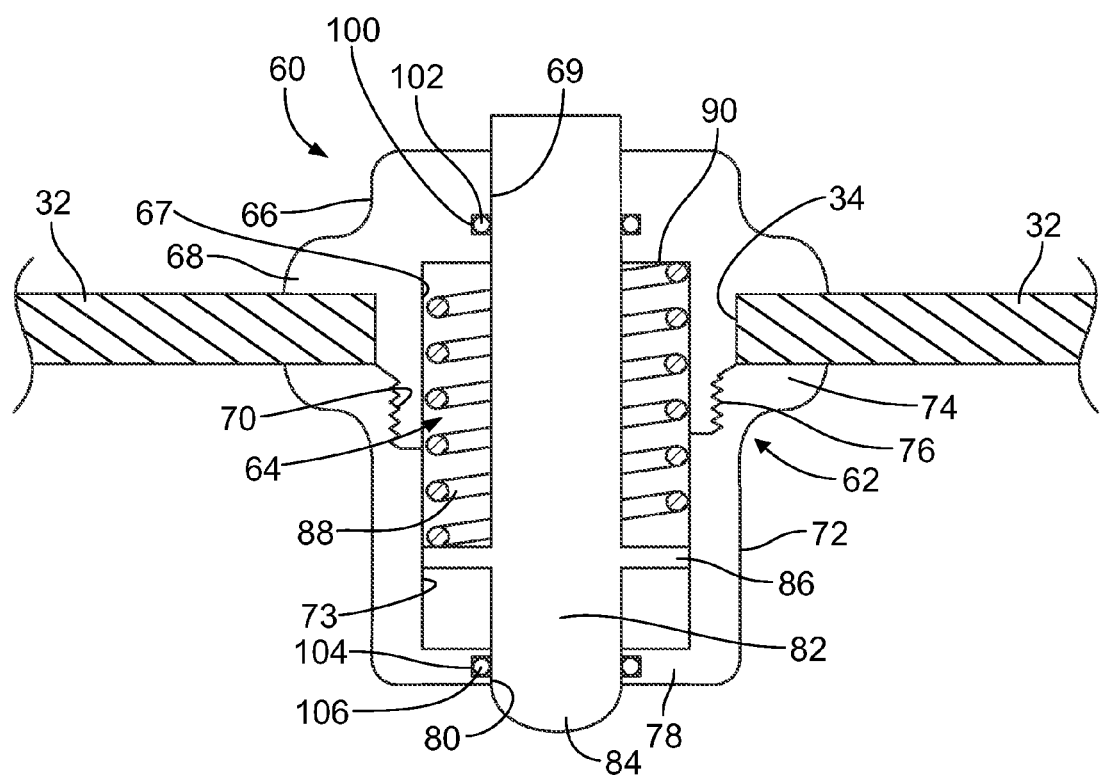
FIG. 6B is an enlarged cross-sectional view of the example indicator shown in FIG. 6 in the alert/failure position.

As can best be seen in FIGS. 6A and 6B, indicator 60 is positioned in an aperture formed in end wall 32 of upper housing 12 and, in the example shown, is generally aligned with the longitudinal axis of tank 10 (see, e.g., FIG. 1). Indicator 60 generally comprises a body 62, indicator arm 82, spring 88, and visual indicator 92.

Body 62 defines an internal cavity 64 and has an upper portion 66 and a lower portion 72. Upper portion 66 is generally cylindrical and has a bore 67 formed therethrough, which forms part of internal cavity 64, and an aperture 69 extends from bore 67 and through a top wall of upper portion 66. Groove 100 is formed in upper portion 66 along aperture 69 and is configured to retain an o-ring 102, which provides an air and fluid tight seal between upper portion 66 and indicator arm 82. Threads 70 are formed on an external surface of upper portion 66, which, in the example shown, are used to connect upper portion 66 to lower portion 72. Alternatively, other than threads 70, any other well known mechanical attachment could also be used to connect upper portion 66 to lower portion 72. A flange 68 extends radially outward from upper portion 66 around the circumference of upper portion 66. In the example shown, upper portion 66 extends through aperture 34 in end wall 32 of upper housing 12 so that a side of flange 68 contacts the outer surface of end wall 32 and threads 70 extend into cavity 14. Upper portion 66 is sealed against end wall 32 to provide a water and gas tight seal. This seal can be formed by any well known means, such as o-rings, gaskets, welds, threads, etc., as long as a hermetic seal is formed to prevent the passage of air and fluid.

Lower portion 72 is also generally cylindrical and has a bore 73 formed therethrough, which also forms part of internal cavity 64. Threads 76 are formed on an internal surface of lower portion 72, which, in the example shown, engage threads 70 of upper portion 66 and are used to connect lower portion 72 to upper portion 66. Alternatively, any well know means could be used to connect lower portion 72 to upper portion 66, such as a snap fit, adhesives, welds, etc. In the example shown, an optional flange 74 extends radially outward from lower portion 72 around the circumference of lower portion 72. A side of flange 74 contacts the inner surface of end wall 32 to seal lower portion 72 against end wall 32 to provide a water and gas tight seal. This seal can be formed by any well known means, such as o-rings, gaskets, welds, threads, etc., as long as a hermetic seal is formed to prevent the passage of air and fluid. Bottom wall 78 extends across bore 73 and has an aperture 80, which allows the passage of arm 82. Groove 104 is formed in lower portion 72 along aperture 80 and is configured to retain an o-ring 106, which provides an air and fluid tight seal between lower portion 72 and indicator arm 82.

Indicator arm 82 is generally cylindrical, such as a rod or pin, and is positioned so that it extends through aperture 80 in bottom wall 78, so that a portion is located outside of body 62, and extends through aperture 69 in upper portion 66, so that the top of indicator arm 82 is located inside body 62 when indicator 60 is in a normal operating position and outside body 62 when indicator 60 is in a failure position. A water and gas tight seal is formed between indicator arm 82 and bottom wall 78 by o-ring 106, or by any well known means, such as gaskets, etc., as long as a hermetic seal is formed to prevent the passage of air and fluid between indicator arm 82 and bottom wall 78. Similarly, a water and gas tight seal is formed between indicator arm 82 and upper portion 66 by o-ring 102, or by any other well known means, such as gaskets, etc., as long as a hermetic seal is formed to prevent the passage of air and fluid between indicator arm 82 and upper portion 66. At a longitudinal end, indicator arm 82 forms a cap 84, which has a convex surface that acts as a contact surface for diaphragm 16, as discussed in more detail below. Plate 86 can be integral with or attached to indicator arm 82 and extends radially from indicator arm 82.

Spring 88 is positioned within cavity 14 and extends between plate 86 of indicator arm 82 and shoulder 90, which is formed in upper portion 66. In the example shown, shoulder 90 is formed due to the difference in diameter between bore 67 and aperture 69, however, shoulder 90 can be formed by any wall, protrusion, extension, etc. that can provide a stop surface for spring 88. With indicator 60 in a normal operating position, as shown in FIG. 6A, spring 88 extends between plate 86 and shoulder 90 and biases plate 86 and, therefore, indicator arm 82, in a downward direction. As diaphragm 16 extends upward and contacts cap 84 of indicator arm 82, the force exerted by diaphragm 16 on indicator arm 82 will move indicator arm 82 upward towards an alert/failure position, as shown in FIG. 6B. As indicator arm 82 moves upward, spring 88 is compressed between plate 86 and shoulder 90 and attempts to bias indicator arm back to the normal operating position.

Indicator arm 82 also has a flat top and is slidably disposed within aperture 69 of upper portion 66 with indicator arm 82 in a normal operating position (see FIG. 6A). As described in more detail below, during operation, indicator arm 82 can move longitudinally within aperture 69 to place indicator arm 82 in an alert, or failure, position where a portion of indicator arm 82 protrudes from aperture 69 and is visible above upper portion 66 (see FIG. 6B). Indicator arm 82 can be made from plastic or any other desired material and preferably has a color, pattern, or other visual aide that will alert a user as to a problem if indicator arm 82 is visible. In the example shown, indicator arm 82 is made from red plastic.

Visual indicator 92 also has a generally cylindrical body having flat top and bottom surfaces, and is positioned the end of aperture 69 of upper portion 66, above indicator arm 82, with indicator 60 in a normal operating position (see FIG. 6A). As described in more detail below, during operation, visual indicator 92 can be displaced and pushed out of aperture 69 by indicator arm 82 to place indicator 60 in the alert/failure position (see FIG. 6B). Visual indicator 92 can be made from plastic or any other desired material and preferably has a color, pattern, or other visual aide that will alert a user that tank 10 is operating normally. In the example shown, visual indicator 92 is made from green plastic and has an arcuate flange 94 that extends radially from and circumferentially around the body of visual indicator 92 such that flange 94 covers the top edge of upper portion 66 of body 62.

In use, tank 10 is initially pressurized with air (or another gas) through valve stem 24, which will occupy cavity 14 on a first side of diaphragm 16 as shown in FIG. 1. Well tanks are typically pre-pressurized to approximately 38 psi and expansion tanks are typically pre-pressurized to either 12 psi or 40 psi, depending on the expansion tank.

Figure 2:
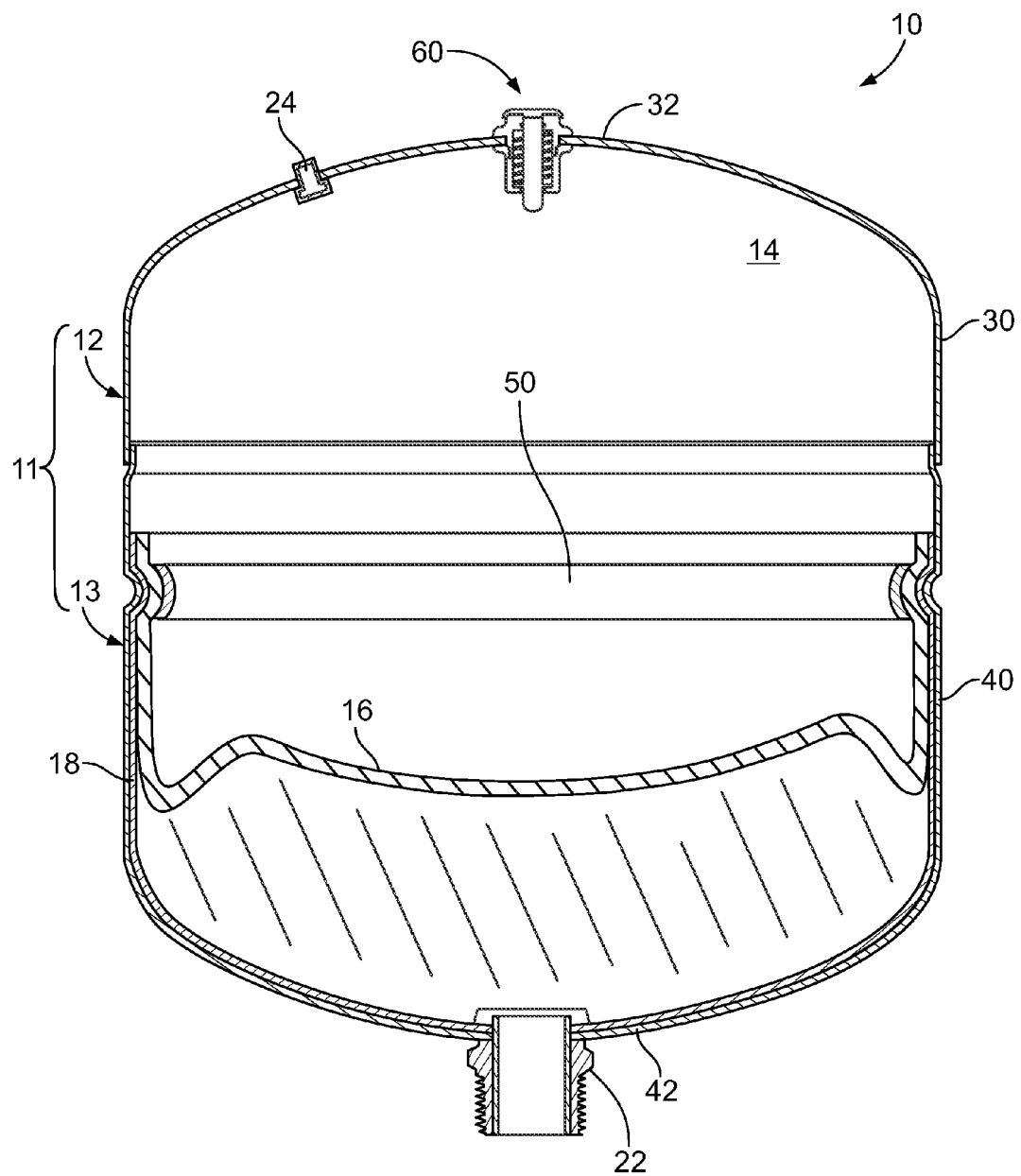
FIG. 2 is a cross-sectional view of the example well/expansion tank of FIG. 1 partially filled with a fluid.

Water is then pumped into tank 10 through fitting 22, which will occupy cavity 14 on a second side of diaphragm 16, opposite the air, as shown in FIG. 2. As tank 10 is being filled, the air will occupy cavity 14 on a first side of diaphragm 16 and the water will occupy cavity 14 on a second, opposing side of diaphragm 16. Diaphragm 16 keeps the air portion of cavity 14 separate from the water portion of cavity 14 and liner 18 protects housing 11 from the water.

Figure 3:
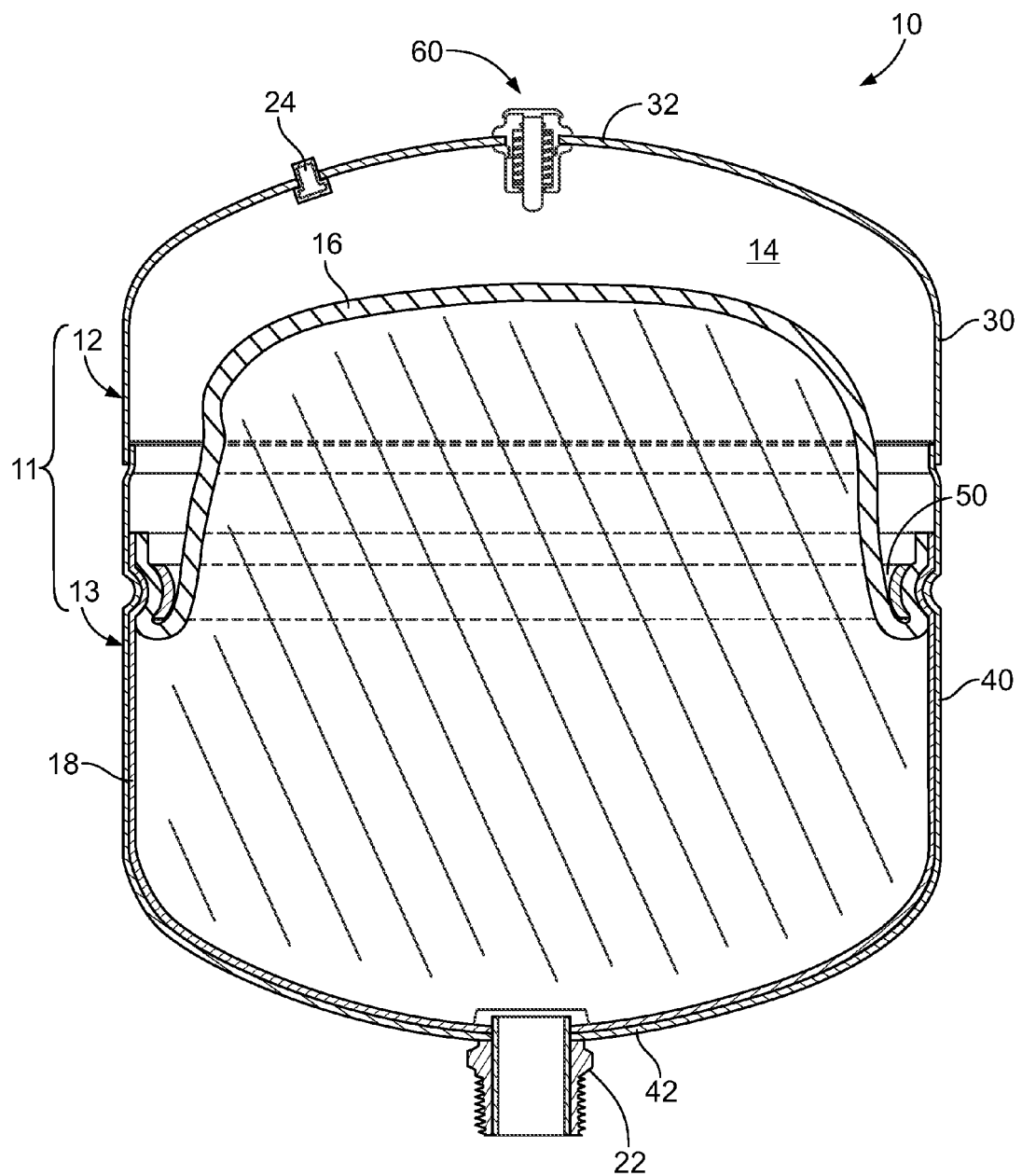
FIG. 3 is a cross-sectional view of the example well/expansion tank of FIG. 1 filled with a fluid.

When tank 10 is "full" (e.g. the water pressure in tank 10 reaches a predetermined pressure value) and tank 10 is operating under normal operating conditions, diaphragm 16 will provide a barrier between the air and water portions of cavity 14 and will be spaced a predetermined distance from end wall 32 of upper housing 13 as shown in FIG. 3.

While tank 10 is being pre-pressurized with air, is being filled with water, and when it is "full" and operating under normal operating conditions, indicator 60 will be in a normal operating position, as shown in FIGS. 1-3 and 6A. In the normal operating position, indicator arm 82 is biased downward by spring 88 such that cap 84 and a portion of indicator arm 82 extend beyond bottom wall 78 and into cavity 14. In this position, indicator arm 82 is fully retracted into aperture 69 in upper portion 66. Visual indicator 92 is inserted into the end of aperture 69 such that flange 94 extends over the end of upper portion 66. In this position, the color, pattern, or other visual aide associated with indicator arm 82 is hidden and the color, pattern, or other visual aide associated with visual indicator 92 is visible to the user, indicating that tank 10 is operating normally.

Figure 4:
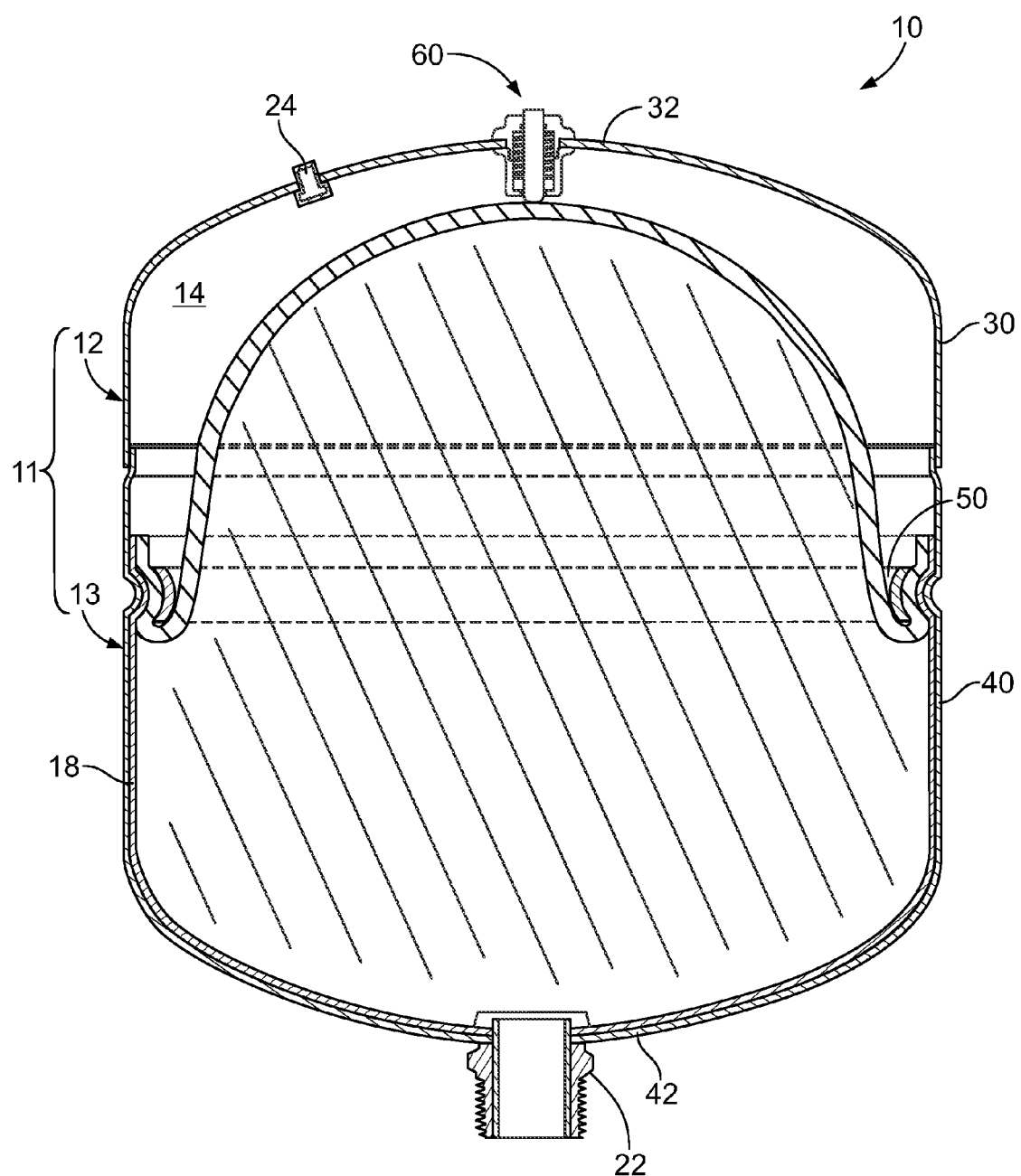
FIG. 4 is a cross-sectional view of the example well/expansion tank of FIG. 1 in a failure mode with an under-pressurized gas section.
Figure 5:
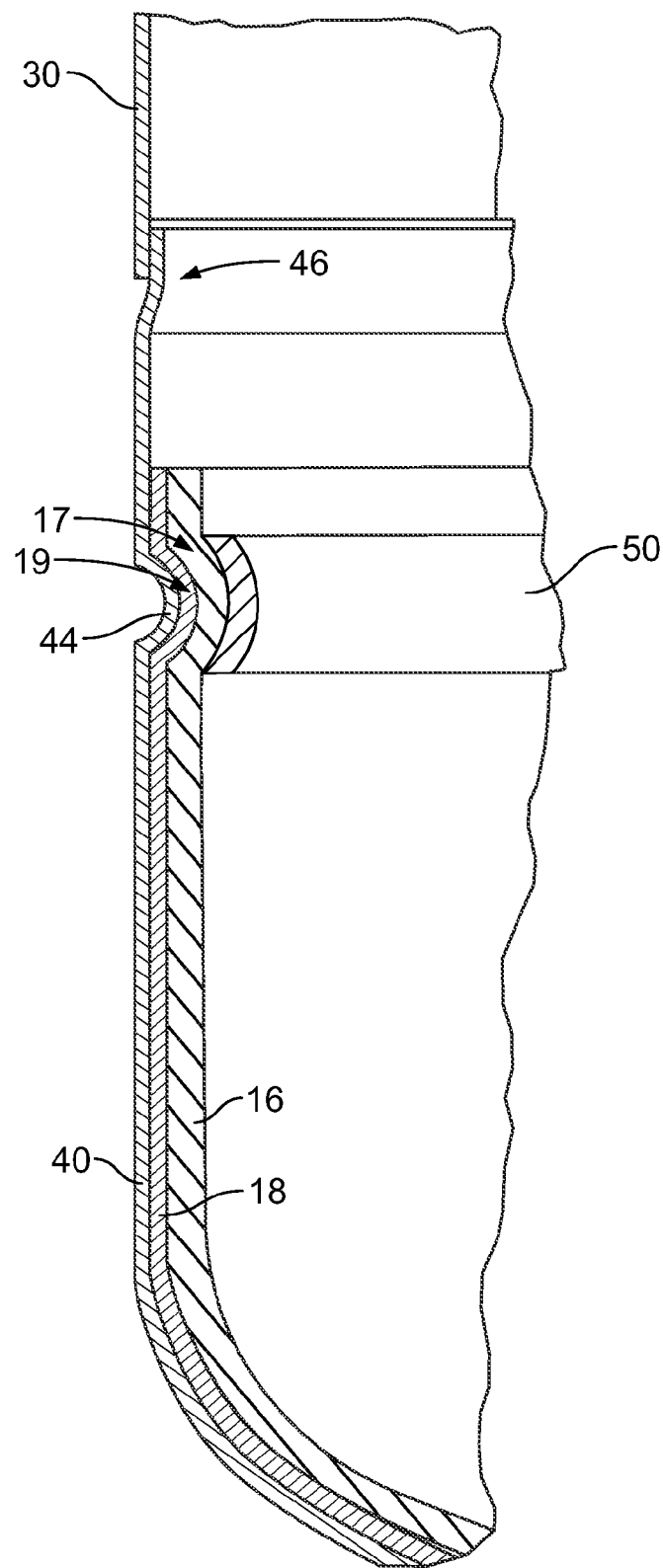
FIG. 5 is an enlarged cross-sectional view of a portion of the example well/expansion tank of FIG. 1.

However, as described above, there are certain situations in which tank 10 will not operate normally, such as when the pre-charge air pressure is not enough to provide an air volume appropriate for the water supply pressure, diaphragm failure, installation of an undersized tank, etc., which can lead to various failures. In these situations, the diaphragm can fill the air portion of the cavity and, if eventually the diaphragm "bottoms out" on the tank wall, the tank becomes ineffective in the function it has been design to provide. When these situations occur and diaphragm 16 approaches/bottoms out on end wall 32 of upper housing 12, indicator 60 moves to the alert/failure position, as shown in FIGS. 4 and 6B. As diaphragm 16 approaches end wall 32 of upper housing 12, it will contact cap 84 of indicator arm 82. As the water pressure increases, the force exerted by diaphragm 16 on indicator arm 82 will exceed the spring force of spring 88 and move indicator arm 82 upwards through aperture 69. As indicator arm 82 moves upwards, it will partially protrude from aperture 69 and displace visual indicator 92 out of aperture 69. Thus, in the alert/failure position, visual indicator 92 has been displaced and indicator arm 82 is visible, indicating to a user that there is a problem with tank 10.

Although a simple mechanical indicator 60 has been described above, alternative indicators can also be used. For example, rather than having a visual indicator that is fully displace and removed, the visual indicator could be rotatably connected to the upper portion of the indicator body, such as by a hinge or living hinge, so that the indicator can be reset once the problem with the tank has been fixed without the possible problem of losing the visual indicator when it is displaced. In addition, rather than a mechanical indicator, the indicator could be an electronic LED warning light or audible buzzer. In these embodiments, movement of the arm upwards would cause a circuit to close, which would activate the light/buzzer (a power source would also be required) when the diaphragm has contacted the indicator. Furthermore, the indicator could also be adapted with the appropriate electronics/software to forward an alert to an email address, cellular phone, or smart phone to alert the user.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications that fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The invention claimed is:
1. A fluid tank, comprising:
a housing comprising an upper end wall, a side wall, and a lower end wall, the upper end wall, side wall, and lower end wall defining a cavity;
a flexible diaphragm positioned within the cavity and connected to the side wall, the diaphragm separating the cavity into an upper portion and a lower portion, wherein the upper portion of the cavity is sealed to contain a pressurized gas and the lower portion is sealed to contain a pressurized fluid;
an indicator positioned in an aperture in the upper end wall of the housing; the indicator comprising:
a body coupled to the aperture and including: a cylindrical sidewall defining a bore therethrough; a bottom wall defining an inward aperture of the bore; and an upper wall defining an outward aperture of the bore;
an indicator arm slidably coupled in the bore, wherein, in a first position the indicator arm is inward of the outward aperture so that the indicator arm is not visible from outside the fluid tank and, in a second position, the indicator arm extends above the outward aperture to be visible; and a visual indicator fixed to the body so that the visual indicator is visible with the indicator in the first position and, in the second position, the visual indicator is displaced from the body by the indicator arm so that even if the indicator arm returns to the first position, displacement of the visual indicator indicates that the indicator arm was in the second position.

2. The fluid tank of claim 1, wherein the side wall of the housing is generally cylindrical, the flexible diaphragm is made of butyl rubber, and the housing is made of steel.

3. The fluid tank of claim 1, further comprising a valve positioned in the upper end wall of the housing and in fluid communication with the upper portion of the cavity.

4. The fluid tank of claim 1, further comprising a fitting positioned in the lower end wall of the housing and in fluid communication with the lower portion of the cavity.

5. The fluid tank of claim 1, further comprising a liner positioned within the lower portion of the cavity and connected to the sidewall.

6. The fluid tank of claim 5, wherein the diaphragm and the liner are connected to the sidewall by a retaining ring.

7. The fluid tank of claim 5, wherein the liner is made of polypropylene.

8. The fluid tank of claim 1, wherein
a top of the indicator arm is positioned within the outward aperture with the indicator in the first position and is positioned outside of the outward aperture with the indicator in the second position; and
the visual indicator has a depending button that is at least partially positioned within the outward aperture with the indicator in the first position and the depending button is completely displaced from the outward aperture with the indicator in the second position.

9. The fluid tank of claim 8, wherein the indicator arm extends through the inward aperture in the bottom wall of the body so that as the flexible diaphragm extends toward the indicator, the flexible diaphragm contacts the indicator arm to move the indicator arm from the first position to the second position.

10. The fluid tank of claim 9, further comprising:
a plate connected to and extending radially around the indicator arm and positioned within the bore of the housing; and
a spring positioned within the bore of the housing and against the plate; wherein
the spring biases the indicator arm into the first position.

11. A method of indicating failure in a fluid tank comprising a flexible diaphragm, the flexible diaphragm dividing the tank into a first pressurized fluid portion and a second pressurized fluid portion, the method comprising:
positioning an indicator in an end wall of the fluid tank, wherein the end wall is in the first pressurized fluid portion of the fluid tank, the indicator comprising an indicator arm that is not visible with the indicator in a first position and visible with indicator in a second position and a visual indicator that covers the indicator arm in the first position and uncovers the indicator arm in the second position;
detecting a proximity of the diaphragm to the end wall of the fluid tank with the indicator; and
moving, by the diaphragm, the indicator from the first position to the second position such that the indicator arm is visible in response to the detection of the proximity of the diaphragm to the upper end wall.

12. The method of claim 11, further comprising pressurizing the first pressurized fluid air portion of the tank through a valve positioned in the end wall of the housing.

13. The method of claim 12, wherein the first pressurized fluid portion of the tank is pressurized to approximately 38 pounds per square inch.

14. The method of claim 12, wherein the first pressurized fluid portion of the tank is pressurized to approximately 12 pounds per square inch.

15. The method of claim 11, further comprising pressurizing the second fluid portion of the tank through a fitting positioned in an opposing end wall of the housing.

16. The method claim 11, wherein:
a top portion of the indicator arm is positioned completely within a body of the indicator with the indicator in the first position and the top portion is partially outside of the body of the indicator with the indicator in the second position; and
the visual indicator is positioned partially within the body of the indicator with the indicator in the first position and displaced from the body of the indicator with the indicator in the second position.

17. The method of claim 16, wherein the indicator arm extends through an aperture in the body.

18. The method of claim 11, further comprising biasing the indicator arm into the first position.

19. An indicator for a fluid tank having a housing defining a cavity with a flexible diaphragm mounted within the cavity to separate the cavity into first and second portions that are sealed to contain pressurized fluid, the indicator comprising:
a body for mounting in an aperture formed in the housing, wherein the body defines a bore therethrough; and
an indicator arm is slidably coupled in the bore and has an outward end and an inward end, wherein,
in a first position, the inward end is in the cavity and the outward end is fully within the bore to indicate normal operation, and
in a second position, the flexible diaphragm has pushed the inward end of the indicator arm so that the outward end extends at least partially out of the bore to indicate alert and/or failed operation.

20. An indicator as recited in claim 19, further comprising a visual indicator coupled to the bore so that as the indicator arm moves from the first position to the second position, the visual indicator is displaced from the bore.

* * * * *